US010604406B2

(12) United States Patent
Herzer et al.

(10) Patent No.: US 10,604,406 B2
(45) Date of Patent: Mar. 31, 2020

(54) MAGNET CORE (75) Inventors: Giselher Herzer, Bruckkoebel (DE); Detlef Otte, Gründau (DE)

(73) Assignee: VACUUMSCHMELZE GMBH & CO. KG, Hanau (DE)

(*) Notice: Subject to any disclaimer, the term of this patent is extended or adjusted under 35 U.S.C. 154(b) by 708 days.

(21) Appl. No.: 11/237,515

(22) Filed: Sep. 27, 2005

(65) Prior Publication Data
US 2006/0077030 A1 Apr. 13, 2006

Related U.S. Application Data (63) Continuation of application No. PCT/EP2004/003485, filed on Apr. 1, 2004.

(30) Foreign Application Priority Data

Apr. 2, 2003 (DE) .................................. 103 15 061

(51) Int. Cl.
*B82Y 25/00* (2011.01)
*H01F 1/00* (2006.01)
(Continued)

(52) U.S. Cl.
CPC ............ *B82Y 25/00* (2013.01); *H01F 1/0063* (2013.01); *H01F 1/15308* (2013.01); *H01F 1/15333* (2013.01); *H01F 41/0206* (2013.01)

(58) Field of Classification Search
CPC . H01F 1/0045; H01F 1/15308; H01F 41/0206
(Continued)

(56) References Cited

U.S. PATENT DOCUMENTS 4,881,989 A * 11/1989 Yoshizawa et al. .......... 148/302
5,069,731 A * 12/1991 Yoshizawa et al. .......... 148/305
(Continued)

FOREIGN PATENT DOCUMENTS

DE    195 48 530 A1    6/1997    ............. H01F 37/00
EP    0 209 742 B1    10/1989    ............. H01F 37/00
(Continued)

OTHER PUBLICATIONS

Schmitt, R. (2002). Electromagnetics Explained—A Handbook for Wireless/RF, EMC, and High-Speed Electronics.. Elsevier. Online version available at: http://www.knovel.com/web/portal/browse/display?_EXT_KNOVEL_DISPLAY_bookid=798&VerticalID=0.*

(Continued)

*Primary Examiner* — Jie Yang
(74) *Attorney, Agent, or Firm* — Dickinson Wright PLLC (57) ABSTRACT A magnet core has a linear B-H loop, a high modulability with alternating current and direct current, a relative permeability of more than 500 but less than 15,000, and a saturation magnetostriction $\lambda_s$ of less than 15 ppm, and is made of a ferromagnetic alloy, at least 50 percent of which consist of fine crystalline parts having an average particle size of 100 nm or less (nanocrystalline alloy) and which is characterized by formula $Fe_aCo_bNi_cCu_dM_eSi_fB_gX_h$, wherein M represents at least one of the elements V, Nb, Ta, Ti, Mo, W, Zr, Cr, Mn, and Hf, a, b, c, d, e, f, g are indicated in atomic percent, X represents the elements P, Ge, C and commercially available impurities, and a, b, c, d, e, f, g, h satisfy the following conditions: $0<=b<=40$; $2<c<20$; $0.5<=d<=2$; $1<=e<=6$; $6.5<=f<=18$; $5<=g<=14$; $h<5$ atomic percent; $5<=b+c<=45$, and $a+b+c+d+e+f+g+h=100$.

19 Claims, 5 Drawing Sheets (51) Int. Cl.
*H01F 41/02* (2006.01)
*H01F 1/153* (2006.01)

(58) Field of Classification Search
USPC .............................. 148/100, 108, 300, 310
See application file for complete search history.

(56) References Cited

U.S. PATENT DOCUMENTS

| | | | |
|---|---|---|---|
| 5,363,079 A * | 11/1994 | Zawada et al. | 336/92 |
| 5,591,276 A | 1/1997 | Yoshizawa et al. | 148/304 |
| 6,270,592 B1 * | 8/2001 | Nakajima et al. | 148/306 |
| 6,425,960 B1 * | 7/2002 | Yoshizawa | H01F 1/15308 |
| | | | 148/121 |
| 6,507,262 B1 | 1/2003 | Otte et al. | 336/213 |
| 6,563,411 B1 * | 5/2003 | Otte | H01F 1/15316 |
| | | | 148/304 |
| 7,358,844 B2 | 4/2008 | Günther et al. | 336/233 |
| 7,442,263 B2 | 10/2008 | Wulf et al. | |
| 7,563,331 B2 | 7/2009 | Petzold et al. | 148/108 |
| 2001/0001398 A1 | 5/2001 | Hasegawa et al. | 148/304 |

FOREIGN PATENT DOCUMENTS

| | | | |
|---|---|---|---|
| EP | 0 429 022 A2 | 11/1990 | ............ H01F 1/153 |
| EP | 0 635 853 A2 * | 1/1995 | |
| EP | 1 096 634 A2 | 6/2000 | ............... H02J 3/01 |
| JP | A-63-128705 | 6/1988 | |
| JP | 05 255820 | 10/1993 | |
| JP | A-09-190910 | 7/1997 | |
| JP | A-2000-119821 | 4/2000 | |
| JP | A-2002-524840 | 8/2002 | |
| JP | A-2002-530854 | 9/2002 | |
| KR | 10 2001 0080443 | 8/2001 | |
| WO | WO 99/45643 | 9/1999 | ............... H03H 7/01 |
| WO | WO 00/17897 | 3/2000 | ............ H01F 38/28 |
| WO | WO 00/30131 | 5/2000 | ............ H01F 38/28 |
| WO | WO 2002/23560 | 3/2002 | |

OTHER PUBLICATIONS

PCT International Search Report, PCT/EP2004/003485, 9 pages, dated Apr. 1, 2004.
"Nanocrystalline Soft Magnetic Alloys," by Giselher Herzer, *Handbook of Magnetic Materials*, vol. 10, 1997.
Korean Office Action dated Sep. 28, 2011, corresponding to PCT/EP2004/003485.
English Language Translation of Korean Office Action dated Sep. 28, 2011, corresponding to PCT/EP 2004/003485.
Office Action for JP Application No. 2013-127729 dated Mar. 28, 2014.

* cited by examiner

MAGNET CORE

CROSS-REFERENCE TO RELATED APPLICATIONS

This application is a continuation of co-pending International Application No. PCT/EP2004/003485 filed Apr. 1, 2004, which designates the United States of America, and claims priority to German application number 103 15 061.7 filed Apr. 2, 2003, the contents of which are hereby incorporated by reference in their entirety.

TECHNICAL FIELD

The invention concerns a magnet core with high modulability for alternating current and direct current components, a method for production of such a magnetic core and applications of such a magnet core especially in current transformers and current-compensated inductors, as well as alloys and bands for production of such a magnet core.

BACKGROUND

High modulability for ac and dc components is required for numerous applications of magnet cores in which, depending on the case, specific modulability for ac and dc is necessary. Applications of magnet cores with high modulability for ac and dc components are present, for example, in current transformers and current-compensated inductors.

Current-compensated noise suppression inductors are described in DE-A 35 26 047 and DE 195 48 530 A1. They have two windings for one-phase application and three or more windings for multiphase applications. The windings of noise suppression inductors are connected so that the magnetic fluxes that are induced by the operating current rise mutually, whereas interference currents that flow with the same phase through the two windings result in magnetization of the soft magnetic core. Because of this the current-compensated noise suppression inductor produced acts as a very small inductive resistance with reference to the operating currents, whereas interference currents, which come from connected equipment, for example, and are closed via the ground, encounter very high inductance.

The core of the known current-compensated noise suppression inductors is produced from amorphous or amount of crystalline alloys, preferably band material. The inductance of the inductor then depends essentially on the relative permeability of the soft magnetic material of the magnet core, in addition to the number of windings and the core cross section.

Current transformers with the magnet cores mentioned in the introduction can be used in watt meters, as described for example in WO 00/30131. Watt meters are used, for example, to record power consumption of electrical equipment and installations in industry and the household. The oldest useful principle is the Ferraris meter. The Ferraris meter is based on power metering via the rotation of a disk connected to a mechanical meter, which is driven by the current- or voltage-proportional fields of corresponding field coils. For expansion of the functional capabilities of watt meters, like multiple rate operation or remote reading, electronic watt meters are used in which current and voltage recording occurs via current and voltage converters. The output signals of these converters are digitized, multiplied, integrated and stored; the result is an electrical quantity that is available for remote reading.

Figure 1:
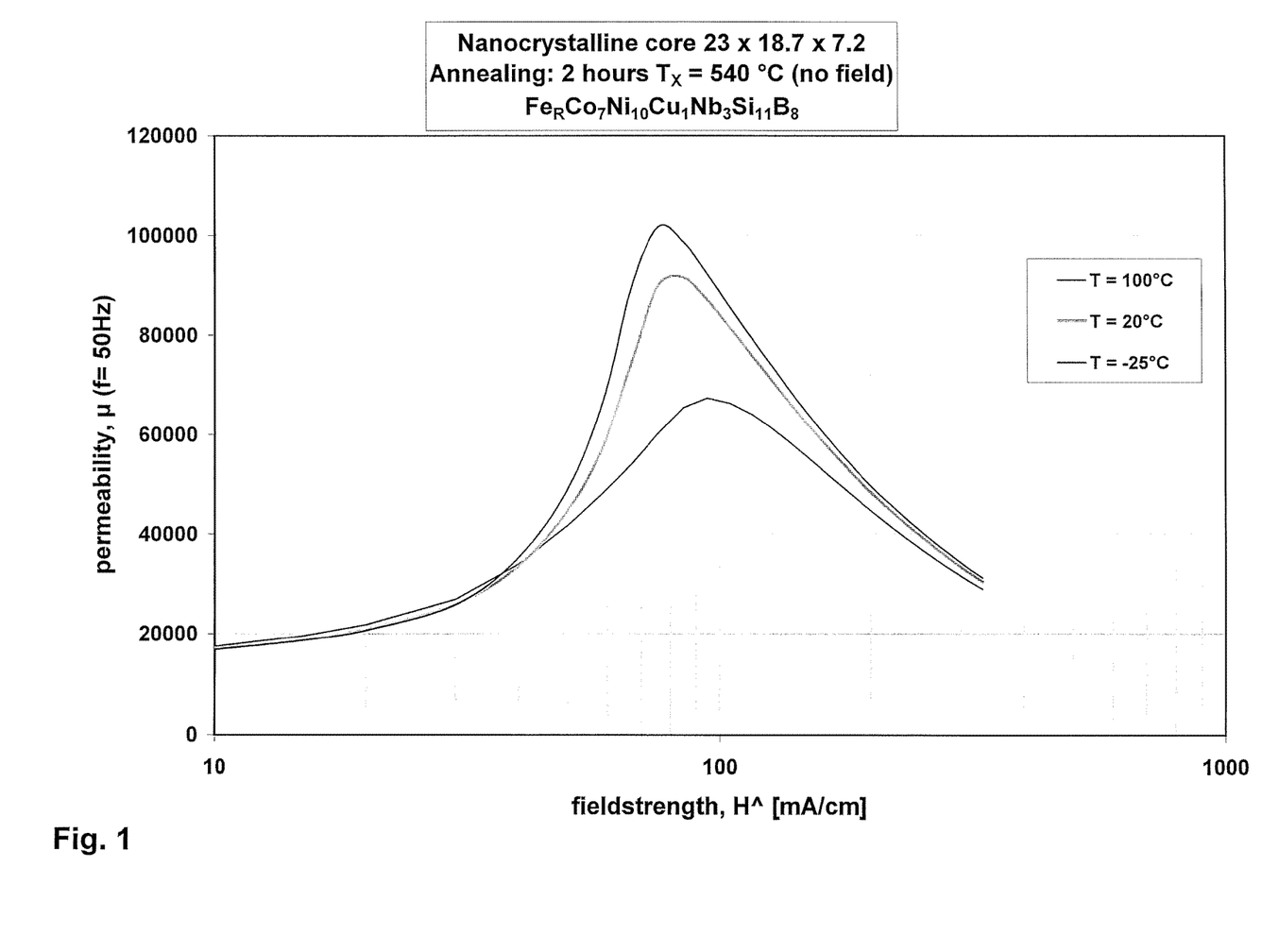
FIG. 1 shows a replacement circuit for a known current converter and the ranges of the different technical data that can occur in an operation.

One of the possible technical variants of such a current converter is the current transformer according to the induction principle. FIG. 1 shows a substitution circuit where this type of current transformer and the ranges of the technical data can occur in different applications. A current transformer 1 is shown here. The primary winding 2, which carries the current $I_{prim}$ to be measured and a secondary winding 3, which carries the secondary current $I_{sec}$ are situated on a magnet core constructed from a soft magnetic material. This current $I_{sec}$ is automatically adjusted so that the primary and secondary ampere turns in the ideal case are the same size and oppositely directed. The trend of the magnetic fields in such a current transformer shown in FIG. 2, in which the losses in the magnet core are not considered because of their generally low value. The current in the secondary winding 3 is then set according to the law of induction so that it attempts to prevent the cause of its formation, namely the time change of the magnetic flux in magnet core 4.

In the ideal current transformer the secondary current, multiplied by the ratio of number of windings is therefore negatively equal to the primary current, which is explained by equation (1):

$$I_{sec}^{ideal} = -I_{prim}\left(\frac{N_{prim}}{N_{sec}}\right) \tag{1}$$

Figure 2:
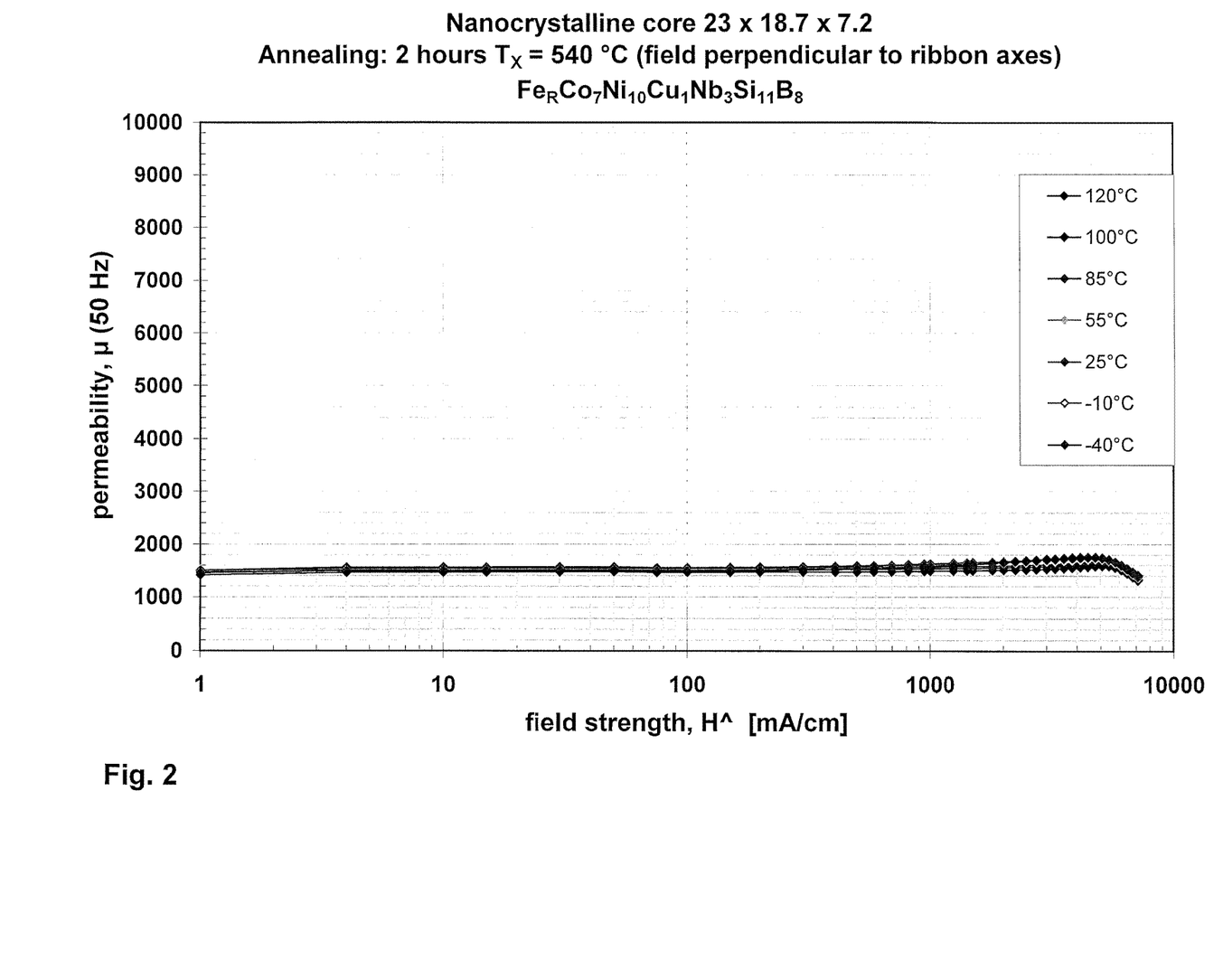
FIG. 2 shows the trend of the magnetic fields in a current converter according to FIG. 1.

This ideal case is never reached because of losses in the load resistance 5, in copper resistance 6 of the secondary winding and in the magnet core 4.

In real current transformers the secondary current therefore has an amplitude error and a phase error relative to the above idealization, which is described by equation (2):

$$\text{Amplitude error: } F(I) = \frac{I_{sec}^{real} - I_{sec}^{ideal}}{I_{sec}^{ideal}}; \tag{2}$$

$$\text{Phase error: } \varphi(I) = \varphi(I_{sec}^{real}) - \varphi(-I_{prim})$$

The output signals of such a current transformer are digitized and further processed in the electronics of the watt meter.

The electronic watt meters used for power metering in industrial applications operate indirectly because of the often very high (>>100 A), i.e., special primary current transformers are connected in front of the current input so that only pure bipolar, zero-symmetric alternating currents (typically 1 ... 6 $A_{eff}$) need be measured in the counter itself. For this purpose current transformers are used constructed from magnet cores of highly-permeable materials, for example nickel-iron alloys containing about 80 wt % nickel and known under the name "Permalloy". These have in principle a very low phase error φ to achieve low measurement errors, for which reason they are also equipped with very many (typically more than 1000) secondary windings.

For use in household meters, which can also be used in small industrial installations, these are not suitable, since with the usual direct connection without primary current transformers connected in front to current intensities can generally be 100 A and more and because of this the above described current transformers will be saturated. In addition, these currents can contain non-zero-symmetric dc fractions that are generated by semiconductor circuits used in modern electrical equipment (for example, rectifier or phase control circuits) and which saturate current transformers with highly permeable magnet cores magnetically and therefore distort the power metering.

The international standards that apply for this of the IEC 62053 stipulate that an electronic watt meter must be able to measure a maximum amplitude of a unipolar half-wave rectified sinusoidal current with a maximum additional error of 3 or 6% to comply with the accuracy classes 1 and 2% for a stipulated maximum measurable effective value $I_{max}$ of a bipolar zero-symmetric sinusoidal current, the numerical value of which is equal to the maximum effective value. In addition to these standards there are regional and national provisions that permit as sufficiently precisely defined behavior power recording even with a low amplitude limit value of the unipolar current.

To form such current, current converters are known which operates on the basis of open magnetic circuits or low-permeability magnetic circuits sheared with mechanically introduced air gaps. An example of such a current converter is a current transformer in which a ferrite-shell core provided with an air gap (sheared) is used as magnet core. This has satisfactory linearity as a function of primary current, but because of the relatively low saturation induction of ferrite a comparatively large volume magnetic core is required in order to achieve a high maximum measurable primary current with high linearity over the entire current range in the current transformers. These current transformers also have high sensitivity to external foreign fields so that fielding measures must also be taken, which are material- and installation-intensive and therefore not very favorable in terms of cost. In addition, the magnetic values are generally strongly temperature dependent, in ferrites.

Current converters are also known that operate on the basis of iron-free air coils. This principle is known as the so-called Rogowski principle. The effect of the properties of a soft magnetic material on measurement accuracy drops out here. Owing to the magnetically open design of such current converters, they must be equipped with particularly demanding shields against external fields, which is also cost-intensive because of the material and installation expenditure.

A technically high-value possibility for implementation is the use of current transformers with relatively low permeability ($\mu$=1400-3000) magnet cores from fast-solidified amorphous soft magnetic materials. The very good constancy of this permeability during changes in the level control guarantees very high linearity of the phase error over the entire current range to be transmitted. Because of the low permeability value saturation with the dc fractions is avoided within calculable limits; on the other hand, it leads to the occurrence of a comparatively high phase error between the primary and secondary current, which must be compensated in watt meters by a corresponding electronic circuit or software. In previously known variants of electronic watt meters a compensation range of typically 0.5-5° is present, in which compensation of higher values of this range, however, requires increasing demands with reference to signal processing semiconductor circuits and memories, which increases the equipment cost. A serious problem from the standpoint of manufacturers competing on the market for watt meters are the costs for the magnetic materials to be used, since the previously used alloys contain about 80 atom % Co, which leads to a comparatively high material price.

SUMMARY

It is the task of the invention to improve a magnet core that has modulability for ac and dc components in its application-related properties. Another task of the invention is to design the magnetic core with respect to its properties so that it is suitable for different applications, as well as applications for such a magnet core. Another task of the present invention is to provide a particular cost-effective magnet core. A final task of the invention is to provide a production method for such magnet cores.

The object can be achieved by a magnet core with a linear B-H loop and a high modulability in alternating current and direct current, comprising a relative permeability $\mu$ that is greater than 500 and less than 15,000, having a saturation magnetostriction $\lambda_s$ whose amount is less than 15 ppm and consisting of a ferromagnetic alloy in which at least 50% of the alloy consists of fine crystalline particles with an average particle size of 100 nm or less (nanocrystalline alloy) and is characterized by the formula $Fe_aCo_bNi_cCu_dM_eSi_fB_gX_h$ in which M is at least one of the elements from the group consisting of V, Nb, Ta, Ti, Mo, W, Zr, Cr, Mn and Hf, a, b, c, d, e, f, g are stated in atom %, X denotes the elements P, Ge, C as well as commercial dopants and a, b, c, d, e, f, g, h satisfy the following conditions:

$0 \leq b \leq 40$;

$2 < c < 20$;

$0.5 \leq d \leq 2$;

$1 \leq e \leq 6$;

$6.5 \leq f \leq 18$, $5 \leq g \leq 14$;

$h < 5$ atom % with $5 \leq b+c \leq 45$, in which $a+b+c+d+e+f=100$.

Furthermore, a, b, c, d, e, f, g, h may satisfy the following conditions:

$0 \leq b \leq 20$;

$2 < c < 15$;

$0.5 \leq d \leq 2$;

$1 \leq e \leq 6$;

$6.5 \leq f \leq 18$;

$5 \leq g \leq 14$;

$h < 5$ atom % with $5 \leq b+c \leq 30$, in which $a+b+c+d+e+f=100$.

Moreover, a, b, c, d, e, f, g, h may satisfy the following conditions:

$0 \leq b \leq 10$;

$2 < c < 15$;

$0.5 \leq d \leq 2$;

$1 \leq e \leq 6$;

$6.5 \leq f \leq 18$, $5 \leq g \leq 14$;

$h < 5$ atom % with $5 \leq b+c \leq 20$, in which $a+b+c+d+e+f=100$.

Also, a, b, c, d, e, f, g, h may satisfy the following conditions:

$0.7 \leq d \leq 1.5;$ $2 \leq e \leq 4;$ $8 \leq f \leq 16;$ $6 \leq g \leq 12;$ with $h < 2.$ The Co content can be less than or equal to the Ni content. The magnet core can be in the form of an annular band core(toroidal core) wound from a band with a thickness of less than 50 μm. The amount of the coercitivity field intensity $H_c$ can be less than 1 A/cm. The remanence ratio can be less than 0.1. The magnet core may have a relative permeability μ greater than 1000 and less than 10,000, particularly a relative permeability μ greater than 1500 and less than 6000. The saturation magnetostriction $\lambda_s$ can be less than 10 ppm. At least 50% of the alloy can be accompanied by fine crystalline particles with an average particle size of 50 nm or less. The magnet core can be configured as a closed toroidal core, oval core or rectangular core without air gap. The magnet core can be fixed in a trough. For fixation of the core a soft elastic reaction adhesive and/or a soft plastic nonreactive paste can be prescribed.

The object can also be achieved by method for production of such a magnet core, wherein the method comprises the step of performing a heat treatment in a magnetic transverse field of the magnet core.

A heat treatment can also be also performed in a magnetic longitudinal field. A heat treatment can also be performed in the transverse field before a heat treatment in a longitudinal field. Alternatively, a heat treatment may be performed in the transverse field after heat treatment in a longitudinal field.

The object can further be achieved by a current transformer for alternating power with such a magnet core, wherein the current transformer, in addition to the magnetic core as transformer core, has a primary winding and at least one secondary winding in which the secondary winding is low-resistance terminated by a load resistance and/or measurement electronics.

The current transformer may have a phase error of a maximum 7.5° in a circuit with a load resistance and/or measurement electronics according to a respective specification and dimension. The current transformer may also have a phase error of a maximum 5° in a circuit with a load resistance and/or measurement electronics according to a respective specification and dimension.

The object can further be achieved by a current-compensated inductor with the above described magnet core wherein the inductor has at least two windings in addition to the magnet core.

The inductor may have an insertion attenuation of at least 20 dB in the frequency range from 150 kHz to 1 MHz even during flow of a discharge current of at least 10% of the nominal current. The inductor may also have an insertion attenuation of at least 20 dB in the frequency range from 150 kHz to 1 MHz even during flow of a discharge current of at least 20% of the nominal current.

In comparison with the prior art a current transformer is significantly improved with a magnet core according to the invention in its properties (for example temperature trend, phase error, maximum primary current, maximum unipolar primary current as well as cost) relative to known current transformers (for example with ferrite cores). The magnet core can also be designed without an air gap enclosed. In addition to high modulability for ac and dc components, it has excellent suitable high linearity of current formation especially for current meter applications over a wide current range at high immunity to external foreign magnetic fields without initial shielding measures. It has therefore been demonstrated that the magnetic cores according to the invention are particularly suitable for current transformers and current-compensated inductors. However, they can also be advantageously used in any other applications.

Because of a simple design of the current transformers and current-compensated inductors possible by the special properties of the magnet core according to the invention with low core masses from alloys that also contain no or only limited amounts of the expensive element Co, as well as with winding with relatively low number of turns, it can also be produced very cheaply and is therefore particularly suitable for the aforementioned applications. The temperature dependence of the mentioned properties is also as low as possible.

In laying out a current transformer according to the invention for a stipulated maximum primary current it was therefore assumed that this current is proportional to the material-specific saturation induction, the core cross section and inversely proportional to the sum of the values for the load resistance and the resistance of the secondary winding. The core size (volume) is the product of core cross section and average magnetic path length. The core mass is obtained by multiplying by the material density. At the same time the maximum unipolar current amplitude is proportional to the material-specific saturation induction and to the average magnetic path length of the core and inversely proportional to the permeability of the material.

A minimal phase error was then achieved, which roughly up to a value of the phase error of about ≤8° is proportional to the aforementioned resistance sum and inversely proportional to permeability. In addition, the greatest possible saturation induction was sought. The amorphous materials with about 80 atom % Co have values for saturation induction of 0.8-1 T. An increase would permit a reduction of the magnet core with the same maximum current or an increase in maximum current at the same core size.

It is initially assumed that the core size (core volume) remains constant. The quantities also generally determined by the meter designer, like number of secondary windings as well as load resistance should not change either. The current transformer during an increase in saturation induction from 0.9 T to 1.2 T, as a nanocrystalline material with 10 atom % Ni has, for example, would therefore be able to form a 33% higher primary current. In addition, such a design with equivalent maximum unipolar current amplitude with increased saturation induction and equivalent core size would permit higher permeability, for example an increase from 1500-3000 in an amorphous material with about 80 atom % Co to 2000-4000 for a nanocrystalline material with 10 atom % Ni. This again leads to a roughly 25% lower phase error, which significantly reduces the compensation expense in the watt meter. If the possibility for reducing the core cross section by 25% is then used for equivalent maximum primary current and the size ratios are correspondingly adjusted for the purpose of reducing the resistance of the secondary winding, it is possible to half the phase error of 5° to 2.5 with the same load resistance.

The costs for the core material in this case during use of nanocrystalline material with 10 atom % Ni could be reduced to about 30% of the material costs and a core made of amorphous material with about 80 atom % Co.

A preferred variant of a magnet core according to the invention suitable in particular for use in a current transformer proposes that the magnet core consist of a round band of ferromagnetic alloy in which at least 50% of the alloy is occupied by fine crystalline particles with an average particle size of 100 nm or less, preferably 50 nm or less (nanocrystalline alloy), having permeability greater than the housing, preferably 1500 and less than 10,000, preferably 6000, which is set perpendicular to the direction of magnetization by tempering in a magnetic field. The saturation induction is then greater than or equal to 1 Tesla.

Further preferred variants also have a saturation magnetostriction $\lambda_s < 15$ ppm (preferably <10 ppm). Such properties can ordinarily be achieved either based only on expensive Co-based alloys, whereas in nanocrystalline Fe-based alloys the permeability range in common alloys is greater than 10,000. The alloy for a magnet core according to the invention has a composition described essentially with the formula $$Fe_a Co_b Ni_c Cu_d M_e Si_f B_g X_h$$

in which M is at least one of the elements V, Nb, Ta, Ti, Mo, W, Zr, Cr, Mn and Hf, a, b, c, d, e, f, g are stated in atom %, X denotes the elements P, Ge, C as well as commercial dopants and in which a, b, c, d, e, f, g, h satisfy the following conditions:

$0 \leq b \leq 40$;

$2 < c < 20$;

$0.5 \leq d \leq 2$;

$1 \leq e \leq 6$;

$6.5 \leq f \leq 18$;

$5 \leq g \leq 14$;

$h < 5$ atom % with $5 \leq b+c \leq 45$, in which $a+b+c+d+e+f=100$.

Magnet cores with an alloy composition a, b, c, d, e, f, g, h that satisfy the following conditions are preferred:

$0 \leq b \leq 20$;

$2 < c < 15$;

$0.5 \leq d \leq 2$;

$1 \leq e \leq 6$;

$6.5 \leq f \leq 18$;

$5 \leq g \leq 14$;

$h < 5$ atom % with $5 \leq b+c \leq 30$, in which $a+b+c+d+e+f=100$.

Magnet cores with an alloy composition a, b, c, d, e, f, g, h that satisfy the following conditions are particularly preferred:

$0 \leq b \leq 10$;

$2 < c < 15$;

$0.5 \leq d \leq 2$;

$1 \leq e \leq 6$;

$6.5 \leq f \leq 18$;

$5 \leq g \leq 14$;

$h < 5$ atom % with $5 \leq b+c \leq 20$, in which $a+b+c+d+e+f=100$.

Excellent results are provided by magnet cores whose alloy compositions satisfy the following conditions:

$0.7 \leq d \leq 1.5$;

$2 \leq e \leq 4$;

$8 \leq f \leq 16$;

$6 \leq g \leq 12$;

$h < 2$ atom % with $5 \leq b+c \leq 20$, in which $a+b+c+d+e+f100$. Preferably the variants have a Co content that is less than the Ni content.

It has been shown that such a magnet core the dependence of permeability on magnetization is very small. The hysteresis loop of the magnet core is therefore very narrow and linear. This requires the smallest possible ratio of remanence induction to saturation induction of less than 30% if possible, preferably 20% and low coercivity field intensities of less than 1 A/cm if possible, better 0.2 A/cm. This leads to high constancy of the permeability values. The nonlinearity of permeability $\Delta\mu/\bar{\mu} < 15\%$ (better less than 10%) in which $\Delta\mu$ represents the largest value for the difference between minimal and maximal value of the permeability over the entire measurable magnetization range up to about 5% below the saturation induction of 1.2 Tesla and $\bar{\mu}$ is the average permeability in this magnetization range.

A current transformer with a magnet core according to the invention has, in addition to the magnet core, at least primary winding and one secondary winding, with which a load resistance is connected in parallel and which closes off the secondary circuit with low resistance. Since the permeability of the magnet core in the mentioned range is essentially independent of magnetization, the absolute phase error and absolute amplitude error of this current converter with such a magnetic core are then almost constant over a wide primary current range. The absolute amplitude error can be smaller than 1%. The absolute phase error can be less than 5°. Because of the good linearity the absolute values of the phase and amplitude errors can be easily compensated by the electronics or software of the watt meter equipped with it, which leads to high measurement accuracy for electrical power.

Because of its narrow crystalline structure the magnet core has surprisingly high aging resistance, which permits an upper application temperature limit for the magnet core above 120° C., special cases even around 150° C. Precisely because of this the current converter with a magnet core is suitable for use well above room temperature.

Properties of the magnet core are weakly temperature dependent, in which this dependence again is largely linear. The temperature coefficient of permeability should then have an absolute value much less than 0.5%/K, preferably less than 0.2%/K.

The invention is also based on the finding that with the alloy of the described composition by appropriate heat treatment a magnet core with the described properties can be produced. Very many parameters must be adjusted to each other so that the magnet core has the described properties.

Because of the nanocrystalline two-phase structure generated during heat treatment with simultaneously high saturation induction and high thermal stability, the underlying prerequisites for good soft magnetic properties are met. The core is preferably produced from bands, which in turn are produced from the alloy according to the invention.

BRIEF DESCRIPTION OF THE DRAWINGS

The invention is further explained below by means of the practical examples depicted in the figures of the drawing. In the drawing.

DETAILED DESCRIPTION

The area of application "current transformers with dc tolerance for electric watt meters" is treated as an example below. It was found in the pertinent investigations that, in the long known conventional current transformers with high-permeability cores, satisfaction of the requirements of the standard series IEC 62053 for dc tolerance is not possible. These standards, which apply for the requirements of electronic household meters with direct connection, require that even in the presence of half-wave-rectified (i.e., purely unipolar) sinusoidal currents power recording must be possible.

Conventional current transformers fail here because the high permeability cores are very quickly saturated by the unipolar flux that builds up. With diminishing permeability of the core material the time constant of the flux decline also drops with inductance so that the solution to the problem was sought in the use of more low-permeable amorphous alloys. However, a shortcoming here is the comparatively high price, which is mostly caused by the amorphous band of about 80% Co.

The starting point for the considerations is therefore defined in alternative very low-permeable ($\mu$ preferably about 1500-6000) alloy variants suitable for replacing the amorphous low-permeability Co-based band with significant cost advantages.

Clarification of the question whether the attainable linearity approaches that of the excellent Co-based bands in this respect so that the requirements on accuracy of power measurement can be met is also important here. It can be accepted with some certain that the higher saturation induction can be transferred to the corresponding application on the way to optimization. A requirement is perfect functionality according to IEC 62053, which previously had a significant technical advantage relative to the use of cheaper ferrite cores.

Initially bands were investigated that are varied in Si content and Nb content. The experimental program included two cores each of each variant with two different temperatures in the transverse field heat treatment and three alloy compositions in the context of random experiments in alloy variation bands were cast from the experimental alloys with a width of 6.2 mm and processed to annular band cores. These were treated to achieve the flattest possible hysteresis loop in the transverse field at different temperatures. Initially the achieved average permeabilities $\mu_{av}$ and other base parameters were determined (see Table 1).

TABLE 1

| Alloys with V and Ni additives. | | | | | | | | | | | | | |
|---|---|---|---|---|---|---|---|---|---|---|---|---|---|
| Core No. | Fe | Ni | Cu | Nb | V | Si | B | $T_{QF}$ (° C.) | $B_{max}$ (T) | $B_r/B_m$ | $H_c$ (mA/cm) | $H_a$ (A/cm) | $\mu$ (av) | $\lambda_2$ (ppm) |
| 1A | Rem | 10 | 1 | 3 | 0 | 15.9 | 6.6 | 540 | 1.12 | 0.008 | 13 | 1.75 | 5.083 | 4.4 |
| 1B | Rem | 10 | 1 | 3 | 0 | 15.9 | 6.6 | 470 | 1.13 | 0.009 | 15 | 2.01 | 4.463 | 2.8 |
| 2A | Rem | 10 | 1 | 3 | 0 | 12.5 | 8 | 540 | 1.19 | 0.008 | 19 | 2.95 | 3.198 | 7.7 |
| 2B | Rem | 10 | 1 | 3 | 0 | 12.5 | 8 | 570 | 1.20 | 0.011 | 35 | 3.49 | 2.735 | 6.7 |
| 3A | Rem | 10 | 1 | 1.5 | 1.5 | 12.5 | 8 | 540 | 1.20 | 0.016 | 59 | 3.71 | 2.578 | 6.5 |
| 3B | Rem | 10 | 1 | 1.5 | 1.5 | 12.5 | 8 | 570 | 1.20 | 0.057 | 216 | 3.94 | 2.425 | 5.8 |

Rem = remainder

At the beginning of the study all cores were inserted stress-free in troughs without filler, which were then suitably wound for the linearity measurements, in which the values at 25° C. were initially considered. The results are summarized in Table 2.

TABLE 2

| Alloys with V and Ni additives and unfixed linearity (voltage stress-free in the trough). | | | | | | | | | | |
|---|---|---|---|---|---|---|---|---|---|---|
| Core No. | Fe | Ni | Cu | Nb | V | Si | B | $T_{QF}$ (° C.) | $\mu_{av}$ | $\Delta\mu/\mu_{av}$ (%) |
| 1A-1 | Remainder | 10 | 1 | 3 | 0 | 15.9 | 6.6 | 540 | 5598 | 6.13 |
| 1A-2 | Remainder | 10 | 1 | 3 | 0 | 15.9 | 6.6 | 540 | 5605 | 6.24 |
| 1B-1 | Remainder | 10 | 1 | 3 | 0 | 15.9 | 6.6 | 570 | 4919 | 6.97 |
| 1B-2 | Remainder | 10 | 1 | 3 | 0 | 15.9 | 6.6 | 570 | 4888 | 6.79 |
| 2A-1 | Remainder | 10 | 1 | 3 | 0 | 12.5 | 8 | 540 | 3549 | 5.49 |
| 2A-2 | Remainder | 10 | 1 | 3 | 0 | 12.5 | 8 | 540 | 3523 | 5.52 |
| 2B-1 | Remainder | 10 | 1 | 3 | 0 | 12.5 | 8 | 570 | 3033 | 4.12 |
| 2B-2 | Remainder | 10 | 1 | 3 | 0 | 12.5 | | 570 | 2981 | 3.48 |
| 3A-1 | Remainder | 10 | 1 | 1.5 | 1.5 | 12.5 | 8 | 540 | 2724 | 5.88 |
| 3A-2 | Remainder | 10 | 1 | 1.5 | 1.5 | 12.5 | 8 | 540 | 2714 | 5.46 |
| 3B-1 | Remainder | 10 | 1 | 1.5 | 1.5 | 12.5 | 8 | 570 | 2282 | 12.5 |
| 3B-2 | Remainder | 10 | 1 | 1.5 | 1.5 | 12.5 | 8 | 570 | 2300 | 12.5 |

For a better overview the linearity of the current trends is expressed by the dimensions $\Delta\mu/\mu_{av}$, in which the last two data points on reaching saturation were not included in the average value. The magnet cores mostly show a linearity that is suitable to ensure the required precision of power measurement over a wide current range during use of the cores for current transformers in electronic watt meters. An exception is variant 3B in which a relatively high value with 12.5% was achieved, which presumably was caused by overtempering in the transverse field.

To determine the applications of the related fixation effect a core of each variant was either coated with an insulating plastic layer or inserted into an adapted plastic trough with soft elastic adhesive and wound/measured again. Significantly different pictures for linearity behavior of the cores were obtained, which is apparent from the two following Tables 3 and 4.

TABLE 3

Linearity fixed close to production (plastic layer).

| Core type/no. | Fe | Ni | Cu | Nb | V | Si | B | $T_{QF}$ (°C.) | $\mu_{av}$ | $\Delta\mu/\mu_{av}$ (%) |
|---|---|---|---|---|---|---|---|---|---|---|
| 1A-1 | Remainder | 10 | 1 | 3 | 0 | 15.9 | 6.6 | 540 | 10,170 | 151 |
| 1B-1 | Remainder | 10 | 1 | 3 | 0 | 15.9 | 6.6 | 570 | 8403 | 138 |
| 2A-1 | Remainder | 10 | 1 | 3 | 0 | 12.5 | 8 | 540 | 6555 | 161 |
| 2B-1 | Remainder | 10 | 1 | 3 | 0 | 12.5 | 8 | 570 | 4881 | 129 |
| 3A-1 | Remainder | 10 | 1 | 1.5 | 1.5 | 12.5 | 8 | 540 | 3696 | 82.9 |
| 3B-1 | Remainder | 10 | 1 | 1.5 | 1.5 | 12.5 | 8 | 570 | 2262 | 35.1 |

TABLE 4

Linearity fixed close to production (plastic trough with self-elastic adhesive).

| Core type/no. | Fe | Ni | Cu | Nb | V | Si | B | $T_{QF}$ (°C.) | $\mu_{av}$ | $\Delta\mu/\mu_{av}$ (%) |
|---|---|---|---|---|---|---|---|---|---|---|
| 1A-1 | Remainder | 10 | 1 | 3 | 0 | 15.9 | 6.6 | 540 | 5716 | 13.2 |
| 1B-1 | Remainder | 10 | 1 | 3 | 0 | 15.9 | 6.6 | 570 | 4947 | 5.15 |
| 2A-1 | Remainder | 10 | 1 | 3 | 0 | 12.5 | 8 | 540 | 3587 | 5.46 |
| 2B-1 | Remainder | 10 | 1 | 3 | 0 | 12.5 | 8 | 570 | 3033 | 3.06 |
| 3A-1 | Remainder | 10 | 1 | 1.5 | 1.5 | 12.5 | 8 | 540 | 2699 | 6.74 |
| 3B-1 | Remainder | 10 | 1 | 1.5 | 1.5 | 12.5 | 8 | 570 | 2305 | 12.7 |

Table 3 shows a very distinct effect of the plastic layer of linearity of the characteristic via the magnetostriction caused by the Ni addition the material reacts so strongly to the shrinkage stress of the layer solidifying at about 120° C. and contracting during cooling that the resulting linearities no longer appear to be useful for use in a precision current transformer. The linearity deviations reach values that lie by a factor of 9 to more than 50 above the values of magnetostriction-free amorphous Co-based alloys used for comparison.

A much more favorable behavior is caused by trough fixation. Here, during use of a soft elastic adhesive the nonlinearities only rise by a maximum of a factor of 2. In each case the variants 1B, 2A, 2B and 3A appear to be useful at room temperature for use of high linear current transformers. For subsequent considerations concerning use over a broad (for example −40 to +70° C.) temperature range, the temperature properties of the complex permeability were also considered. For example, the trends for the core 2A-2 show a negative temperature coefficient of permeability that is almost linear between −40 and +85° C. and has a value of about −0.1%/K for core 2B-2. The value applies both for amplitude of the existing field of 4 mA/cm and for 15 mA/cm. It was found that a positive temperature coefficient for the current transformer is favorable to the extent that it behaves opposite the increasing resistance of the copper wire at increasing temperature and therefore reduces the phase error. During design of the current transformers, the resulting larger variation of errors with temperature must therefore be kept in mind. During use of the soft elastic adhesive it was found that a temperature change both at high and low temperatures leads to addition of linearity deviations of the converter errors. Tensile and compressive stresses occur here on the core, which are transferred because of the elastic behavior of the hardened adhesive from the trough material. A significant reduction of this effect could be achieved by using as filler a soft plastic nonreactive paste instead of a soft elastic reaction adhesive. Linearity values could therefore be kept almost constant within the temperature range from −40 to +85° C.

A distinct advantage of the nanocrystalline material is the variability of permeability, which curing use of trough fixation must also be transported with satisfactory linearity into application. Because of the expanded useful level control range a dc-tolerant current transformer can easily be tuned to an optimum of preloadability. To improve linearities, the magnetostriction can also be reduced if the percentage of added nickel is reduced by 10% in order to arrive at permeabilities of 4000 or 6400.

Figure 3:
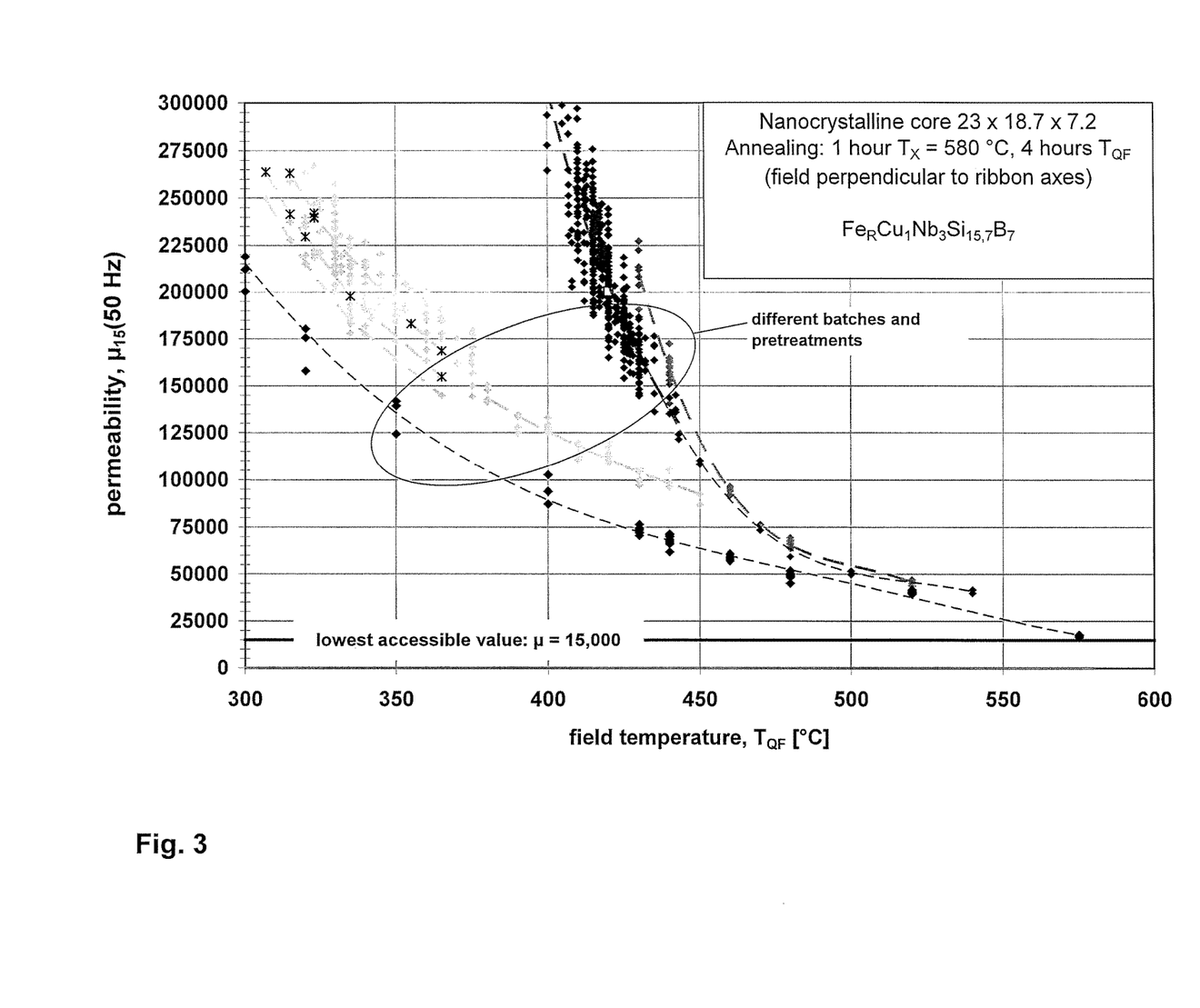
FIG. 3 shows the trend of the amplitude error (in %) and the phase error (in °) as a function of primary current (in A) for a nominal primary current $I_{primN}$ of 640 Å.
Figure 4:
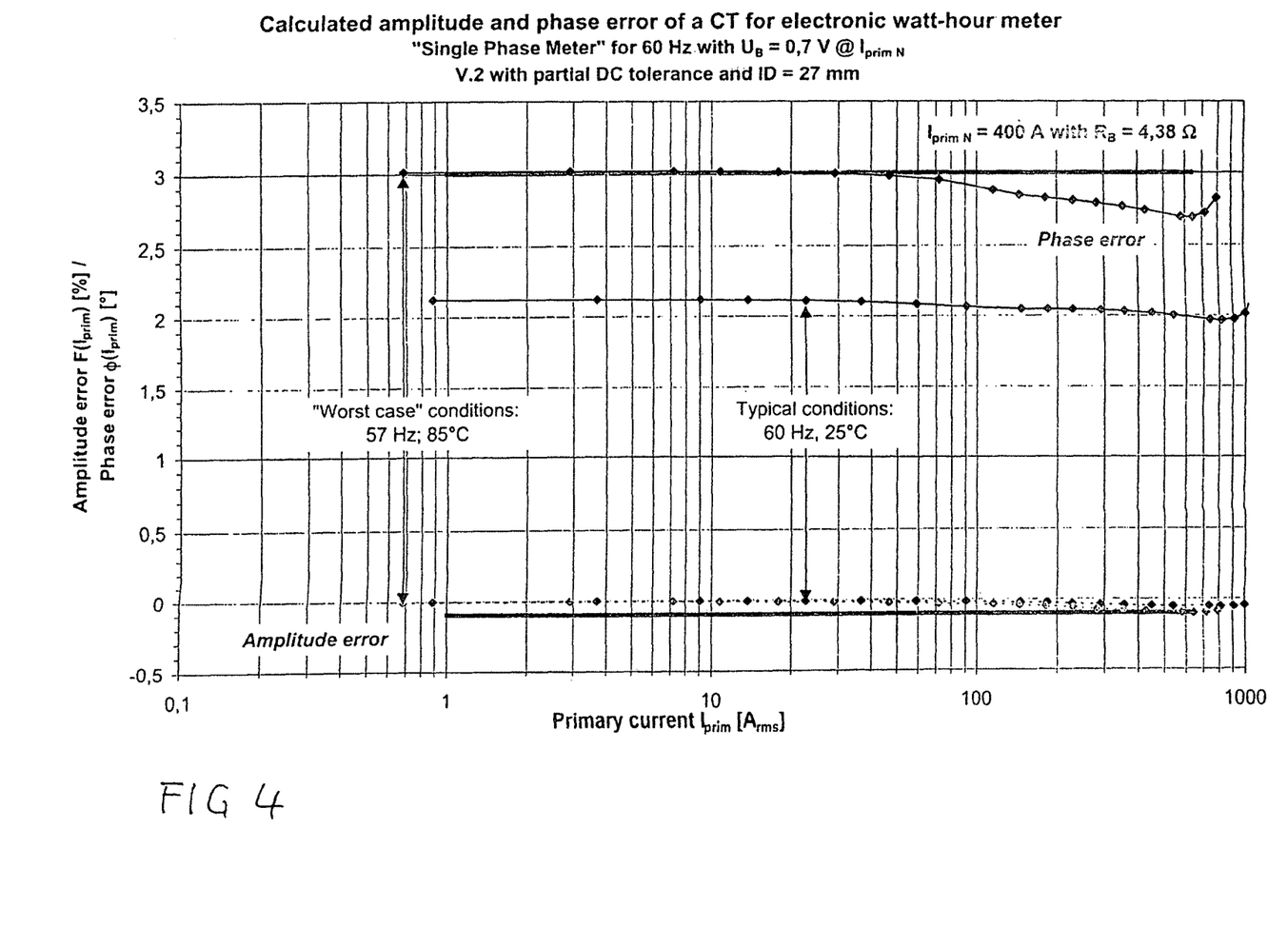
FIG. 4 shows the trend of the amplitude error (in %) and the phase error (in °) as a function of primary current (in A) for a nominal primary current $I_{primN}$ of 400 Å and FIG. 5 shows the hysteresis loop for a preferred alloy according to the invention.

FIGS. 3 and 4 show the trend of the amplitude error (in %) and the phase error (in °) as a function of primary current (in A) for different nominal primary currents $I_{primN}$ of 640 A (FIG. 3) and 400 A (FIG. 4).

Figure 5:
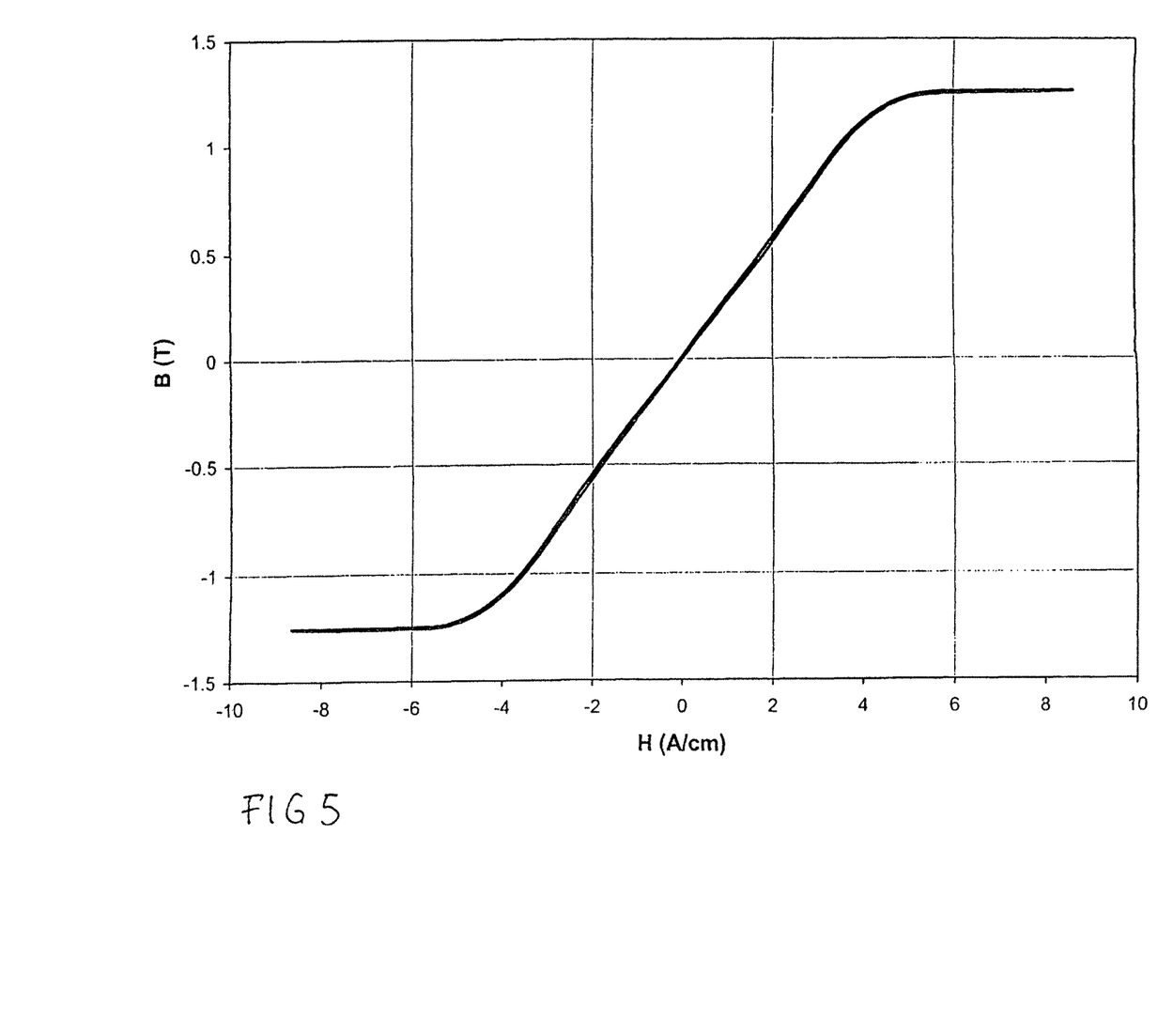

FIG. 5 finally shows the hysteresis loop (magnetic flux B in T over the field intensity H in A/cm) for an alloy with 65.2 atom % Fe, 12 atom % Ni, 0.8 atom % Cu, 2.5 atom % Nb, 11.5 atom % Si and 8 atom % B. This alloy is compared with other alloys according to the invention in Table 5, in which QF stands for the transverse field treatment and LF for longitudinal field treatment. The alloys marked with an * are comparison alloys that do not belong to the invention.

Heat treatment in the transverse field (transverse field treatment QF) is always necessary, in which the permeability can be arbitrarily adjusted with additional heat treatment in the longitudinal field (longitudinal field treatment LF) which can occur before or after transverse field treatment. This has the advantage that cores with different properties can be produced from the same alloy and therefore different classes of current transformers (current classes). The combination of temperature and duration of transverse field treatment should always have a stronger effect than temperature and duration of longitudinal field treatment.

TABLE 5

| Nr | Fe | Co | Ni | Cu | Nb | V | Si | B | WB | $B_m$ (T) | $B_r/B_m$ | $H_c$ (A/cm) | $\mu$ | TK (%/°C.) | $\lambda_s$ (ppm) |
|---|---|---|---|---|---|---|---|---|---|---|---|---|---|---|---|
| 1 | 75.5 | | 0 | 1 | 3 | | 12.5 | 8 | 0.5 h 550° C. QF | 1.32 | 0.006 | 0.005 | 10600 | −0.25 | 4.4 |
| 2 | 70.5 | | 5 | 1 | 3 | | 12.5 | 8 | 0.5 h 550° C. QF | 1.28 | 0.001 | 0.008 | 5020 | −0.18 | — |
| 3a | 65.5 | | 10 | 1 | 3 | | 12.5 | 8 | 0.5 h 570° C. QF | 1.23 | 0.006 | 0.019 | 2630 | −0.13 | — |
| 3b | 65.5 | | 10 | 1 | 3 | | 12.5 | 8 | 0.5 h 550° C. QF | 1.21 | 0.001 | 0.005 | 2837 | −0.17 | — |
| 3c | 65.5 | | 10 | 1 | 3 | | 12.5 | 8 | 0.5 h 540° C. QF | 1.19 | 0.008 | 0.019 | 3200 | 0.16 | 7.7 |
| 3d | 65.5 | | 10 | 1 | 3 | | 12.5 | 8 | 0.5 h 550° C. LF + 3 h 500° C. QF | 1.21 | 0.001 | 0.015 | 6080 | −0.05 | — |

TABLE 5-continued

| Nr | Fe | Co | Ni | Cu | Nb | V | Si | B | WB | $B_m$ (T) | $B_r/B_m$ | $H_c$ (A/cm) | μ | TK (%/° C.) | $\lambda_s$ (ppm) |
|---|---|---|---|---|---|---|---|---|---|---|---|---|---|---|---|
| 3e | 65.5 | | 10 | 1 | 3 | | 12.5 | 8 | 0.5 h 550° C. LF + 3 h 460° C. QF | 1.20 | 0.003 | 0.030 | 7140 | −0.01 | — |
| 3f | 65.5 | | 10 | 1 | 3 | | 12.5 | 8 | 0.5 h 550° C. LF + 3 h 423° C. QF | 1.20 | 0.002 | 0.018 | 8360 | 0.03 | — |
| 4 | 65.5 | | 10 | 1 | 1.5 | 1.5 | 12.5 | 8 | 0.5 h 540° C. QF | 1.20 | 0.016 | 0.059 | 2578 | −0.16 | 6.5 |
| 5a | 60.5 | | 15 | 1 | 3 | | 12.5 | 8 | 0.5 h 550° C. QF | 1.12 | 0.005 | 0.026 | 1860 | −0.12 | — |
| 5b | 60.5 | | 15 | 1 | 3 | | 12.5 | 8 | 0.5 h 550° C. LF + 3 h 500° C. QF | 1.12 | 0.036 | 0.073 | 4590 | 0.03 | — |
| 5c | 60.5 | | 15 | 1 | 3 | | 12.5 | 8 | 0.5 h 550° C. LF + 3 h 460° C. QF | 1.12 | 0.036 | 0.061 | 5420 | −0.001 | — |
| 5d | 60.5 | | 15 | 1 | 3 | | 12.5 | 8 | 0.5 h 550° C. LF + 3 h 423° C. QF | 1.12 | 0.044 | 0.031 | 6490 | 0.02 | — |
| 6 | 55.5 | | 20 | 1 | 3 | | 12.5 | 8 | 0.5 h 550° C. QF | 0.18 | 0.140 | 1.14 | 175 | | |
| 7 | 64.5 | | 10 | 1 | 3 | | 14 | 7.5 | 0.5 h 550° C. QF | 1.10 | 0.005 | 0.012 | 3520 | −0.15 | — |
| 8 | 66 | | 10 | 1 | 3 | | 11 | 9 | 0.5 h 550° C. QF | 1.25 | 0.001 | 0.003 | 2617 | −0.15 | 8.7 |
| 9a | 63.5 | | 10 | 1 | 3 | | 15.9 | 6.6 | 0.5 h 550° C. QF | 1.14 | 0.002 | 0.003 | 4307 | −0.12 | — |
| 9b | 63.5 | | 10 | 1 | 3 | | 15.9 | 6.6 | 0.5 h 540° C. QF | 1.12 | 0.008 | 0.013 | 5080 | −0.09 | 4.4 |
| 10 | 63.5 | | 10 | 1 | 1.5 | 1.5 | 15.9 | 6.6 | 0.5 h 540° C. QF | 1.12 | 0.011 | 0.026 | 3400 | −0.12 | 3.1 |
| 11 | 66.7 | | 10 | 0.8 | 3 | | 11.5 | 8 | 0.5 h 550° C. QF | 1.23 | 0.000 | 0.002 | 2610 | −0.14 | 8.1 |
| 12 | 67 | | 10 | 0.8 | 2.7 | | 11.5 | 8 | 0.5 h 550° C. QF | 1.27 | 0.001 | 0.003 | 2610 | −0.13 | — |
| 13 | 69.2 | | 8 | 0.8 | 2.5 | | 11.5 | 8 | 0.5 h 550° C. QF | 1.32 | 0.012 | 0.041 | 3090 | −0.12 | 7.6 |
| 14 | 67.2 | | 10 | 0.8 | 2.5 | | 11.5 | 8 | 0.5 h 550° C. QF | 1.29 | 0.006 | 0.022 | 2650 | −0.12 | — |
| 15 | 65.2 | | 12 | 0.8 | 2.5 | | 11.5 | 8 | 0.5 h 550° C. QF | 1.26 | 0.004 | 0.019 | 2230 | −0.11 | 8.8 |
| 16 | 63.2 | | 14 | 0.8 | 2.5 | | 11.5 | 8 | 0.5 h 550° C. QF | 1.16 | 0.110 | 0.620 | 1720 | 0.09 | — |
| 17 | 67.4 | | 10 | 0.8 | 2.3 | | 11.5 | 8 | 0.5 h 550° C. QF | 1.30 | 0.016 | 0.063 | 2610 | −0.09 | — |
| 18 | 67.6 | | 10 | 0.8 | 2.1 | | 11.5 | 8 | 0.5 h 550° C. QF | 1.30 | 0.064 | 0.253 | 2600 | 0.04 | — |
| 19 | 66.8 | | 10 | 0.8 | 2.9 | | 11.5 | 8 | 0.5 h 550° C. QF | 1.25 | 0.012 | 0.041 | 2787 | −0.14 | 7.9 |
| 20 | 61.8 | 5 | 10 | 0.8 | 2.9 | | 11.5 | 8 | 0.5 h 550° C. QF | 1.25 | 0.008 | 0.039 | 2045 | −0.13 | 10.7 |
| 21 | 56.8 | 10 | 10 | 0.8 | 2.9 | | 11.5 | 8 | 0.5 h 550° C. QF | 1.24 | 0.012 | 0.073 | 1627 | −0.15 | 12.5 |
| 22 | 46.8 | 20 | 10 | 0.8 | 2.9 | | 11.5 | 8 | 0.5 h 550° C. QF | 1.22 | 0.015 | 0.127 | 1097 | −0.16 | 20.5 |
| 23 | 36.8 | 30 | 10 | 0.8 | 2.9 | | 11.5 | 8 | 0.5 h 550° C. QF | 1.17 | 0.018 | 0.208 | 845 | −0.17 | 23.5 |
| 24 | 26.8 | 40 | 10 | 0.8 | 2.9 | | 11.5 | 8 | 0.5 h 550° C. QF | 1.03 | 0.040 | 0.519 | 582 | −0.46 | 22 |

The values listed in the above Table 5 mean:
1. QF=heat treatment in magnetic transverse field, LF heat treatment in magnetic longitudinal field.
2. Bm was measured at a maximum field intensity of Hm=8 A/cm for examples 1 to 21 and Hm=32 A/cm for examples 22 to 24.
3. μ denotes the average permeability, defines the average slope of the hysteresis curve.
4. No. 1 and No. 6 are comparative examples NOT according to the invention.

The numbering of the alloys from Table 5 differs from that in Tables 1-4. The permeability values between Table 5 and the other tables can therefore easily differ, since different experimental series are involved.

With the magnet cores according to the invention current transformers can be produced in which the maximum undistorted amplitude of a half-wave electrified sinusoidal primary current has a numerical value at least 10%, better 20% of the effective value of the maximum undistorted bipolar sinusoidal primary current.

What is claimed is:
1. A current transformer for alternating power with a magnet core having a relative permeability μ that is greater than 500 and less than 15,000, a ratio of remanence induction to saturation induction of less than 30%, and a saturation magnetostriction $\lambda_s$ whose amount is less than 15 ppm and comprising:
a ferromagnetic alloy in which at least 50% of the alloy consists of fine crystalline particles with an average particle size of 100 nm or less and having the formula $Fe_aCo_bNi_cCu_dM_eSi_fB_gX_h$, wherein M is at least one of the elements from the group consisting of V, Nb, Ta, Ti, Mo, W, Zr, Cr, Mn and Hf,
a, b, c, d, e, f, g, and h are stated in atom %,
X denotes the elements P, Ge, and C, and
a, b, c, d, e, f, g, and h satisfy the following conditions:

$a=100-b-c-d-e-f-g-h;$ $0\leq b\leq40;$ $2<c<20;$ $0.5\leq d\leq2;$ $1\leq e\leq4;$ $6.5\leq f\leq18;$ $5\leq g\leq14;$ $h<5;$ $5\leq b+c\leq45;$ and b≤c so that the Co content is less than or equal to the Ni content;
wherein the current transformer, in addition to the magnetic core as transformer core, has a primary winding and at least one secondary winding, wherein the secondary winding is terminated by a load resistance of a predetermined ohmage and/or measurement electronics.
2. The current transformer according to claim 1, wherein a, b, c, d, e, f, g, and h satisfy the following conditions:

$a=100-b-c-d-e-f-g-h;$ $0\leq b\leq20;$ $2<c<15;$ $0.5 \leq d \leq 2;$ $1 \leq e \leq 4;$ $6.5 \leq f \leq 18;$ $5 \leq g \leq 14;$ $h < 5$ atom %; and with $5 \leq b+c \leq 30$.

3. The current transformer according to claim 1, wherein a, b, c, d, e, f, g, and h satisfy the following conditions:

$a = 100 - b - c - d - e - f - g - h;$ $0 \leq b \leq 10;$ $2 < c < 15;$ $0.5 \leq d \leq 2;$ $1 \leq e \leq 4;$ $6.5 \leq f \leq 18;$ $5 \leq g \leq 14;$ $h < 5$ atom %; and with $5 \leq b+c \leq 20$.

4. The current transformer according to claim 1, wherein d, e, f, g, and h satisfy the following conditions:

$0.7 \leq d \leq 1.5;$ $2 \leq e \leq 4;$ $8 \leq f \leq 16;$ $6 \leq g \leq 12;$ with $h < 2.$ 5. The current transformer according to claim 1, wherein the magnet core is in the form of an annular band core wound from a band with a thickness of less than 50 μm.

6. The current transformer according to claim 1, wherein the amount of a coercivity field intensity $H_c$ is less than 1 A/cm.

7. The current transformer according to claim 1, wherein a remanence ratio is less than 0.1.

8. The current transformer according to claim 1 having a relative permeability μ greater than 1000 and less than 10,000.

9. The current transformer according to claim 1 having a relative permeability μ greater than 1500 and less than 6000.

10. The current transformer according to claim 1, wherein a saturation magnetostriction $\lambda_s$ is less than 10 ppm.

11. The current transformer according to claim 1, wherein at least 50% of the alloy is accompanied by fine crystalline particles with an average particle size of 50 nm or less.

12. The current transformer according to claim 1, wherein the magnet core is fixed in a trough.

13. The current transformer according to claim 12, wherein for fixation of the core a soft elastic reaction adhesive and/or a soft plastic nonreactive paste is provided.

14. The current transformer according to claim 1 having a phase error of a maximum 7.5° in a circuit with a load resistance and/or measurement electronics according to a respective specification and dimension.

15. The current transformer according to claim 14 having a phase error of a maximum 5° in a circuit with a load resistance and/or measurement electronics according to a respective specification and dimension.

16. A method for production of a magnet core having a relative permeability μ that is greater than 500 and less than 15,000, a ratio of remanence induction to saturation induction of less than 30%, and a saturation magnetostriction $\lambda_s$ whose amount is less than 15 ppm and comprising:
a ferromagnetic alloy in which at least 50% of the alloy consists of fine crystalline particles with an average particle size of 100 nm or less and having the formula $Fe_aCo_bNi_cCu_dM_eSi_fB_gX_h$ wherein M is at least one of the elements from the group consisting of V, Nb, Ta, Ti, Mo, W, Zr, Cr, Mn and Hf,
a, b, c, d, e, f, and g are stated in atom %,
X denotes the elements P, Ge, and C, and
a, b, c, d, e, f, g, and h satisfy the following conditions:

$a = 100 - b - c - d - e - f - g - h;$ $0 \leq b \leq 40;$ $2 < c < 20;$ $0.5 \leq d \leq 2;$ $1 \leq e \leq 4;$ $6.5 \leq f \leq 18;$ $5 \leq g \leq 14;$ $h < 5$ atom %;

with $5 \leq b+c \leq 45$, in which a+b+c+d+e+f=100, and the method comprising the step of performing a heat treatment in a magnetic transverse field of the magnet core.

17. A method according to claim 16, wherein a heat treatment is also performed in a magnetic longitudinal field.

18. A method according to claim 16, wherein a heat treatment is performed in the transverse field before a heat treatment in a longitudinal field.

19. A method according to claim 16, wherein a heat treatment is performed in the transverse field after heat treatment in a longitudinal field.

* * * * *